(12) United States Patent
Hecht

(10) Patent No.: US 11,090,730 B2
(45) Date of Patent: Aug. 17, 2021

(54) INDEXABLE CUTTING INSERT HAVING TWO CUTTING PORTIONS LOCATED IN DIAGONALLY OPPOSITE QUADRANTS AND TWO LOWER ABUTMENT ELEMENTS, AND CUTTING TOOL THEREFOR

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 288 days.

(21) Appl. No.: 16/411,189

(22) Filed: May 14, 2019

(65) Prior Publication Data

US 2020/0361001 A1 Nov. 19, 2020

(51) Int. Cl.
*B23B 27/02* (2006.01)
*B23B 27/00* (2006.01)

(52) U.S. Cl.
CPC ........ *B23B 27/007* (2013.01); *B23B 2220/12* (2013.01)

(58) Field of Classification Search
CPC ....... B23B 27/007; B23B 27/02; B23B 27/04; B23B 2200/16; B23B 2200/161; B23B 2205/12
See application file for complete search history.

(56) References Cited

U.S. PATENT DOCUMENTS

| 6,582,163 | B2 | 6/2003 | Hansson et al. | |
| 8,449,225 | B2 | 5/2013 | Gati | |
| 8,678,717 | B2 * | 3/2014 | Inoue | B23B 29/043 |
| | | | | 407/116 |
| 2014/0294525 | A1 | 10/2014 | Hecht | |

FOREIGN PATENT DOCUMENTS

JP 2008-260090 10/2008

OTHER PUBLICATIONS

International Search Report dated Sep. 2, 2020, issued in PCT counterpart application (No. PCT/IL2020/050465).
Written Opinion dated Sep. 2, 2020, issued in PCT counterpart application (No. PCT/IL2020/050465).

* cited by examiner

*Primary Examiner* — Alan Snyder
(74) *Attorney, Agent, or Firm* — Womble Bond Dickinson (US) LLP

(57) ABSTRACT

An indexable cutting insert has a central mounting portion and two cutting portions. The central mounting portion has opposing upper and lower surfaces. The lower surface has two abutment elements associated therewith, each abutment element having two diverging abutment surfaces forming two abutment angles. The two cutting portions extend away from the central mounting portion, have distal cutting edges, and are entirely located in diagonally opposite imaginary quadrants of four quadrants defined by two mutually perpendicular quadrant planes. Two abutment bisector planes bisecting the two abutment angles and one of the quadrant planes are parallel or coincident. In a top view, the two cutting portions extend away from the central mounting portion in opposite directions. Two cutting bisector lines parallel to the two directions and bisecting the two cutting edges are mutually offset. A cutting tool has an insert holder and the cutting insert removably retained therein.

25 Claims, 8 Drawing Sheets

INDEXABLE CUTTING INSERT HAVING TWO CUTTING PORTIONS LOCATED IN DIAGONALLY OPPOSITE QUADRANTS AND TWO LOWER ABUTMENT ELEMENTS, AND CUTTING TOOL THEREFOR

FIELD OF THE INVENTION

The present invention relates to an indexable cutting insert having two cutting portions located in diagonally opposite quadrants and two abutment elements, and a cutting tool having such cutting insert, for use in metal cutting processes in general, and for grooving operations in a limited working space in particular.

BACKGROUND OF THE INVENTION

Within the field of cutting tools used in grooving operations in a limited working space, there are some examples of a cutting inserts having two cutting portions located in diagonally opposite quadrants.

U.S. Pat. No. 6,582,163 discloses a tool for chip removing machining includes a holder and a cutting insert removably mounted therein. The insert includes a shaft having opposite ends and defining a first longitudinal center line. A cutting head projects integrally from at least one end of the shaft. The cutting head includes a cutting edge forming an angle of 45 degrees with the first longitudinal center line. Alternatively, or additionally, the cutting head defines a second longitudinal center line forming an angle of 45 degrees with the first longitudinal center line.

U.S. Pat. No. 8,449,225 discloses a metal cutting tool having an insert holder and a cutting insert releasably secured therein. The insert holder has upper and lower blocks and upper and lower jaws, each jaw projects from the front end of each respective block. The cutting tool has a cutting portion support projecting transversely from the front end of the lower clamp at an angle α. The cutting insert has a shaft and a first cutting portion projecting transversely from the shaft at the angle α. The cutting insert has non-planar abutment surfaces formed to mate with corresponding, non-planar support surfaces located on the lower and upper jaws and on the cutting portion support.

It is an object of the present invention to provide an improved cutting insert.

It is also an object of the present invention to provide an improved cutting tool, having the cutting insert removably secured in an insert holder with a high level of stability.

It is a further object of the present invention to provide an improved cutting tool, in which the insert holder is manufactured efficiently and cost-effectively.

It is yet a further object of the present invention to provide an improved cutting tool, suitable for cutting operations in which there is limited access to a rotating workpiece.

SUMMARY OF THE INVENTION

In accordance with the present invention, there is provided an indexable cutting insert, comprising:
a central mounting portion and first and second cutting portions,
the central mounting portion having opposing upper and lower surfaces, an interconnecting peripheral side surface, and an insert axis passing through the upper and lower surfaces defining an upward-to-downward direction,
the upper surface facing in the upward direction,
the lower surface facing in the downward direction and having spaced apart first and second male and/or female abutment elements associated therewith,
the first abutment element having diverging left and right first abutment surfaces transverse to the lower surface, which in a cross-section taken in a first horizontal plane perpendicular to the insert axis and intersecting the first and second abutment elements has left and right first imaginary straight abutment lines tangential to the left and right first abutment surfaces forming a first local abutment angle, and a first abutment bisector plane parallel to or containing the insert axis bisects the first local abutment angle,
the second abutment element having diverging left and right second abutment surfaces transverse to the lower surface, which in a cross-section taken in the first horizontal plane has left and right second imaginary straight abutment lines tangential to the left and right second abutment surfaces forming a second local abutment angle, and a second abutment bisector plane parallel to or containing the insert axis bisects the second local abutment angle,
the first and second cutting portions extending away from the central mounting portion and having distal first and second major cutting edges, respectively, and the first and second cutting portions being entirely located in diagonally opposite imaginary quadrants of four imaginary quadrants defined by mutually perpendicular first and second quadrant planes containing the insert axis,
each cutting portion having a rake surface adjacent to its respective major cutting edge facing in the upward direction,
wherein:
the first and second abutment bisector planes and the first quadrant plane are parallel or coincident,
and wherein in a top view of the cutting insert:
the first and second cutting portions extend away from the central mounting portion in opposite first and second directions, respectively,
first and second cutting bisector lines parallel to the first and second directions bisect the first and second major cutting edges, respectively, and
the first and second cutting bisector lines are mutually offset.

Also, in accordance with the present invention, there is provided an insert holder and an indexable cutting insert removably retained therein,
the insert holder having a holder head and a holder shank longitudinally extending in a rearward direction therefrom along a holder axis,
the holder head having a seat surface and spaced apart first and second male and/or female support elements associated with the seat surface,
the first support element having first and second support walls transverse to the seat surface,
the second support element having a third support wall transverse to the seat surface,
in a cross-section taken in a second horizontal plane parallel to the seat surface and intersecting the first and second support elements, first and third imaginary straight support lines tangential to the first and third support walls form a support angle of less than 180 degrees, the cutting insert having a central mounting portion and first and second cutting portions, the central mounting portion having opposing upper and lower surfaces, an interconnecting peripheral side surface, and an insert axis passing through the upper and lower surfaces defining an upward-to-downward direction, the upper surface facing in the upward direction and having a force application aperture or recess associated therewith, the lower surface facing in the downward direction and having spaced apart first and second male and/or female abutment elements associated therewith, the first abutment element having diverging left and right first abutment surfaces transverse to the lower surface, which in a cross-section taken in a first horizontal plane perpendicular to the insert axis and intersecting the first and second abutment elements has left and right first imaginary straight abutment lines tangential to the left and right first abutment surfaces forming a first local abutment angle, and a first abutment bisector plane parallel to or containing the insert axis bisects the first local abutment angle, the second abutment element having diverging left and right second abutment surfaces transverse to the lower surface, which in a cross-section taken in the first horizontal plane has left and right second imaginary straight abutment lines tangential to the left and right second abutment surfaces forming a second local abutment angle, and a second abutment bisector plane parallel to or containing the insert axis bisects the second local abutment angle, the first and second cutting portions extending away from the central mounting portion and having distal first and second major cutting edges, respectively, and the first and second cutting portions being entirely located in diagonally opposite imaginary quadrants of four imaginary quadrants defined by mutually perpendicular first and second quadrant planes containing the insert axis, each cutting portion having a rake surface adjacent to its respective major cutting edge facing in the upward direction, wherein:

the first and second abutment bisector planes and the first quadrant plane are parallel or coincident, wherein in each index position of the cutting insert:

only one of the two cutting portions is operative, the lower surface is in contact with the seat surface, a clamping member engages the clamping aperture or recess and applies a clamping force thereto, the left and right first abutment surfaces or the left and right second abutment surfaces are in contact with the first and second support walls, respectively, and one of the left and right first abutment surfaces or one of the left and right second abutment surfaces is in contact with the third support wall, and wherein in a top view of the cutting tool:

at least a point along the operative major cutting edge is located in a stable region subtended by the support angle.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
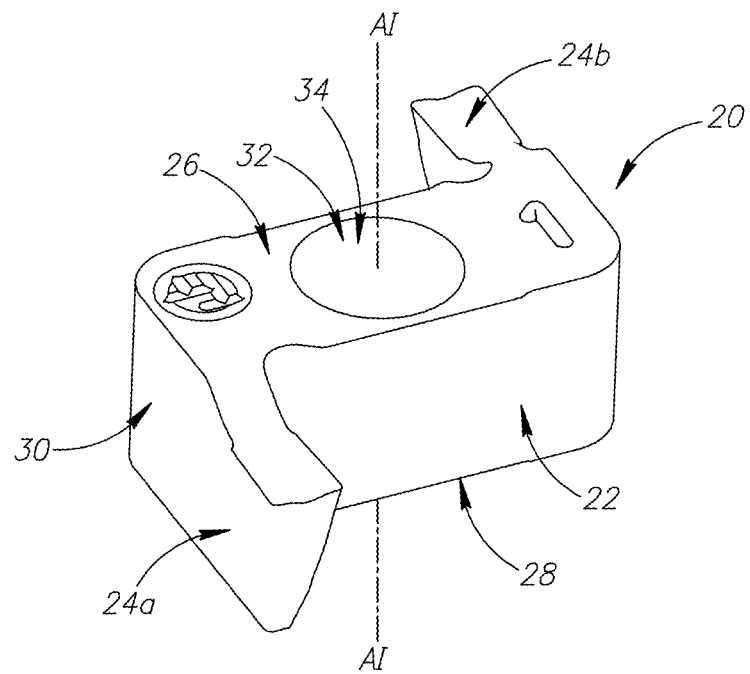
FIG. 1 is a first perspective view of a cutting insert in accordance with some embodiments of the present invention.
Figure 2:
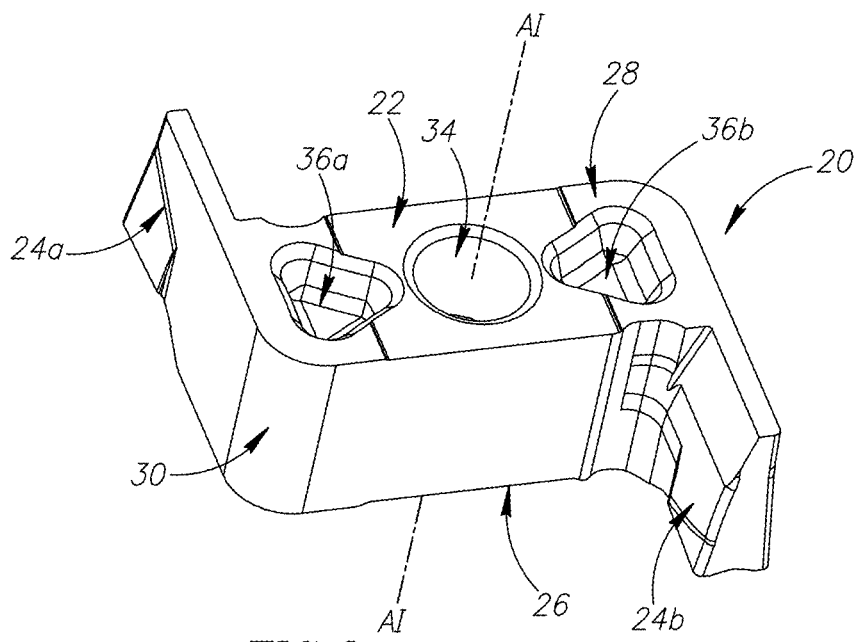
FIG. 2 is a second perspective view of the cutting insert shown in FIG. 1.
Figure 3:
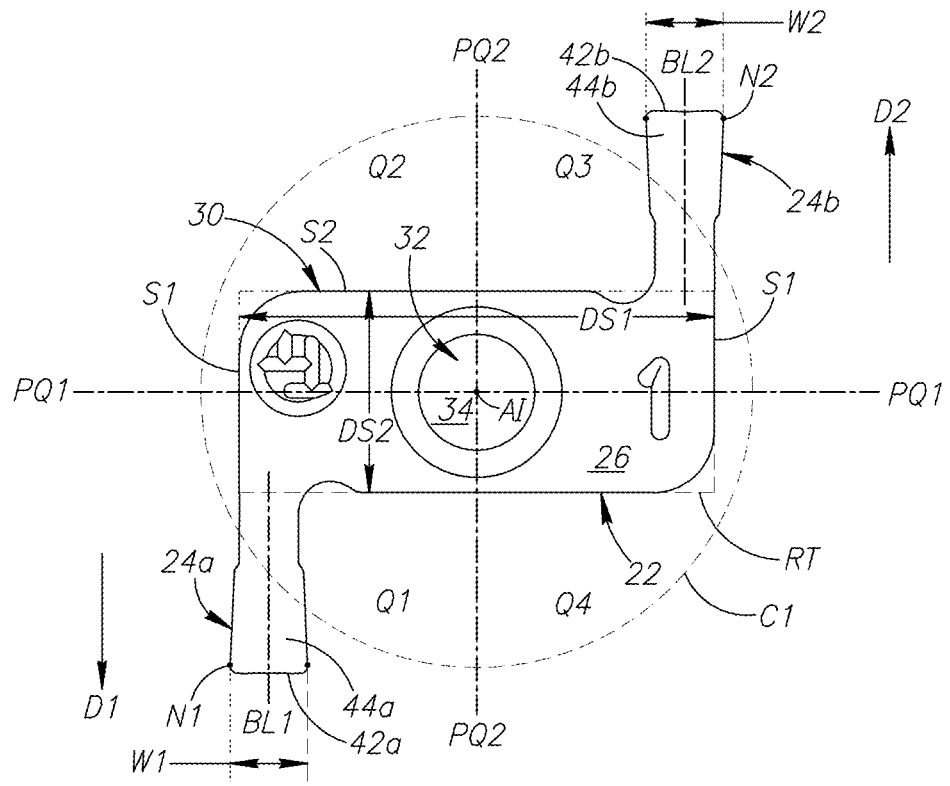
FIG. 3 is a top view of the cutting insert shown in FIG. 1.
Figure 4:
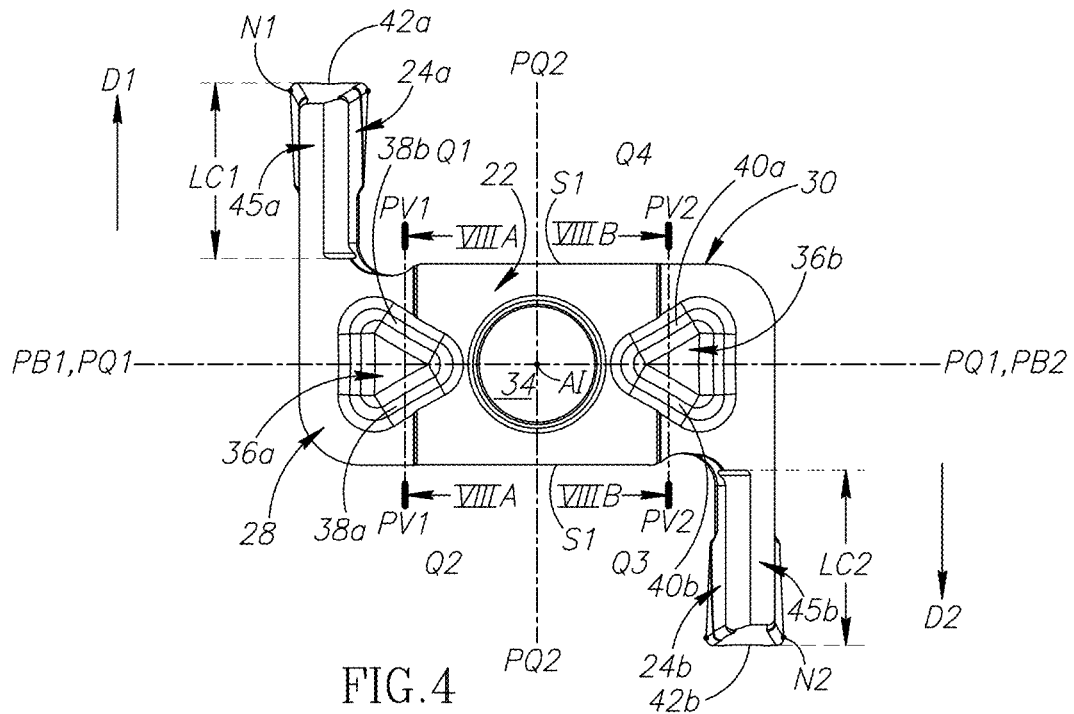
FIG. 4 is a bottom view of the cutting insert shown in FIG. 1.

As shown in FIGS. 1 to 6, one aspect of the present invention relates to an indexable cutting insert 20 having a central mounting portion 22 and first and second cutting portions 24a, 24b. As seen in FIGS. 3 and 4, in a top or bottom view of the cutting insert 20, the cutting portions 24a, 24b may project transversely, and in generally opposite directions, from opposite ends of the central mounting portion 22.

In some embodiments of the present invention, the cutting insert 20 may preferably be manufactured by form pressing and sintering a cemented carbide, such as tungsten carbide, and may be coated or uncoated.

The central mounting portion 22 has opposing upper and lower surfaces 26, 28, an interconnecting peripheral side surface 30, and an insert axis AI passing through the upper and lower surfaces 26, 28 defining an upward-to-downward direction DU, DD.

In some embodiments of the present invention, the lower surface 28 may be planar.

It should be appreciated that use of the term "planar", throughout the description and claims, with respect to the lower surface 28, covers the possibility of the lower surface 28 having a plurality of spaced apart coplanar sub-surfaces.

In some embodiments of the present invention, the insert axis AI may be perpendicular to the lower surface 28.

Figure 5:
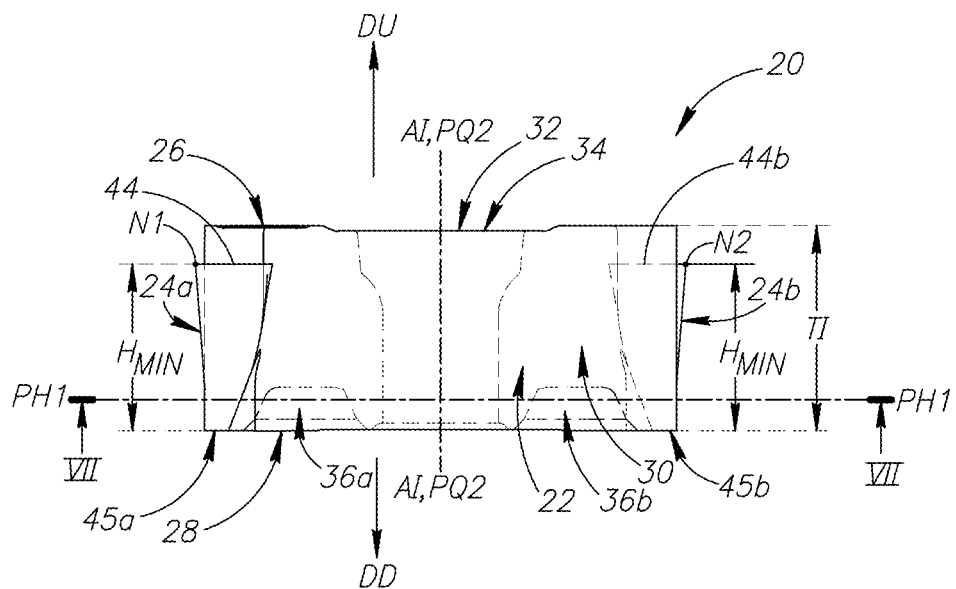
FIG. 5 is a first side view of the cutting insert shown in FIG. 1.
Figure 6:
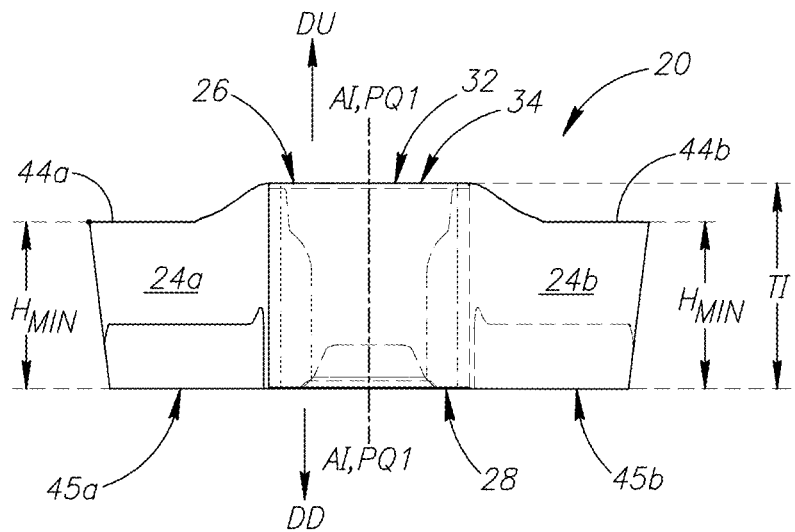
FIG. 6 is a second side view of the cutting insert shown in FIG. 1.

As shown in FIGS. 5 and 6, the upper surface 26 faces in the upward direction DU, the lower surface 28 faces in the downward direction DD, and the upper and lower surfaces 26, 28 define an insert thickness TI.

In some embodiments of the present invention, the upper surface 26 may have a force application aperture or recess 32 associated therewith.

Also, in some embodiments of the present invention, the force application aperture or recess 32 may be in the form of a clamping through bore 34 intersecting the upper and lower surfaces 26, 28.

Further, in some embodiments of the present invention, the clamping through bore 34 may be coaxial to the insert axis AI.

As shown in FIGS. 2 and 4, the lower surface 28 has spaced apart first and second lower abutment elements 36a, 36b associated therewith. Each of the lower abutment elements 36a, 36b may be either male or female.

It should be appreciated that use of the term "associated therewith", throughout the description and claims, with respect to the first and second male and/or female abutment elements 36a, 36b and the lower surface 28, covers the possibility of the first and second abutment elements 36a, 36b being male elements disposed on (i.e., protruding from) the lower surface 28, and also the possibility of the plurality of the first and second abutment elements 36a, 36b being female elements being disposed in (i.e., recessed into) the lower surface 28.

In some embodiments of the present invention, as shown in FIG. 2, the first and second abutment elements 36a, 36b may be female-type elements.

Also, in some embodiments of the present invention, the first and second abutment elements 36a, 36b may exhibit rotational symmetry about the insert axis AI.

As shown in FIG. 4, the first abutment element 36a has diverging left and right first abutment surfaces 38a, 38b transverse to the lower surface 28.

Also, as shown in FIG. 4, the second abutment element 36b has diverging left and right second abutment surfaces 40a, 40b transverse to the lower surface 28.

For embodiments of the present invention, in which the first and second abutment elements 36a, 36b are female-type elements, the left and right first abutment surfaces 38a, 38b may diverge away from the insert axis AI and the left and right second abutment surfaces 40a, 40b may diverge away from the insert axis AI.

Figure 7:
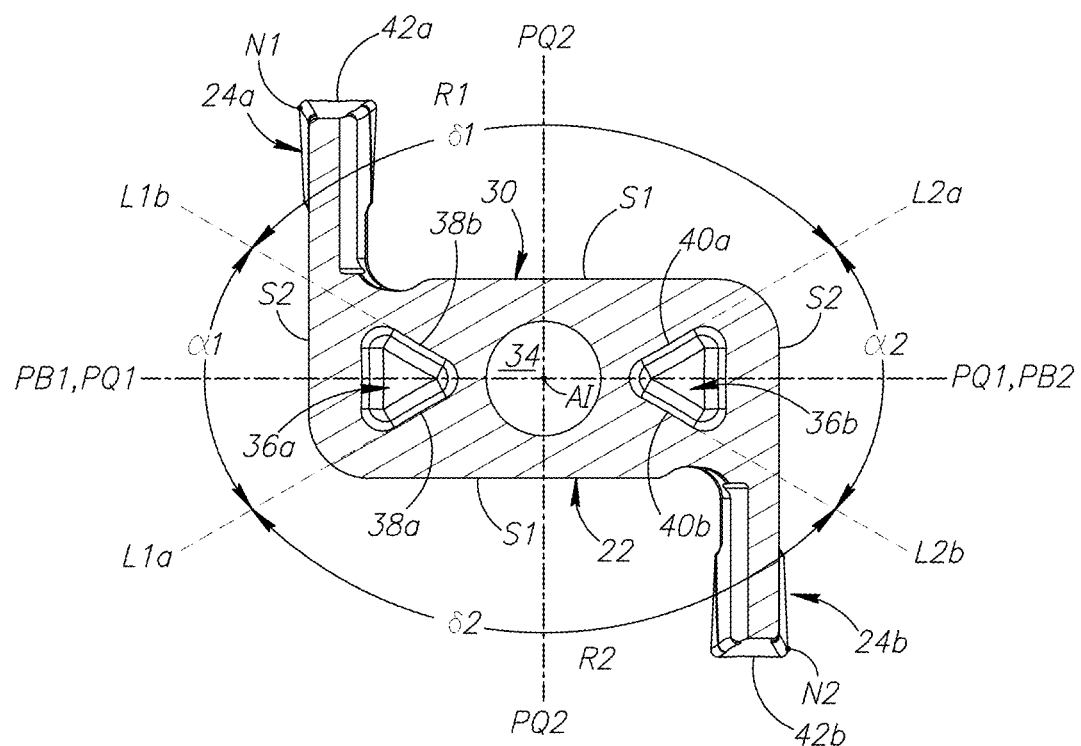
FIG. 7 is a cross-sectional view of the cutting insert shown in FIG. 5, taken along the line VII-VII.

As shown in FIG. 7, in a cross-section taken in a first horizontal plane PH1 perpendicular to the insert axis AI and intersecting the first and second abutment elements 36a, 36b, the first abutment element 36a has left and right first imaginary straight abutment lines L1a, L1b tangential to the left and right first abutment surfaces 38a, 38b forming a first local abutment angle α1.

In some embodiments of the present invention, in a cross-section taken in the first horizontal plane PH1, the left and right first abutment surfaces 38a, 38b may be linear and coincident with the left and right first imaginary straight abutment lines L1a, L1b.

As shown in FIG. 7 in a cross-section taken in the first horizontal plane PH1, the second abutment element 36b has left and right second imaginary straight abutment lines L2a, L2b tangential to the left and right second abutment surfaces 40a, 40b forming a second local abutment angle α2.

In some embodiments of the present invention, in a cross-section taken in the first horizontal plane PH1, the left and right second abutment surfaces 40a, 40b may be linear and coincident with the left and right second imaginary straight abutment lines L2a, L2b.

As shown in FIG. 7, the first and second local abutment angles α1, α2 may be acute angles of at least 30 degrees, i.e. α1≥30° and α2≥30°.

In some embodiments of the present invention, the first and second local abutment angles α1, α2 may be equal.

For embodiments of the present invention, in which the first and second abutment elements 36a, 36b are female-type elements, the first and second local abutment angles α1, α2 may be external angles.

It should be appreciated that use of the term "external angle" throughout the description and claims refers to an angle associated with two surface components as measured external to the member(s) on which these surface components are formed.

As shown in FIG. 7, a first abutment bisector plane PB1 containing the insert axis AI bisects the first local abutment angle α1, and a second abutment bisector plane PB2 containing the insert axis AI bisects the second local abutment angle α2.

In some embodiments of the present invention, the first and second abutment bisector planes PB1, PB2 may be coincident.

In other embodiments of the present invention (not shown), the first and second abutment bisector planes PB1, PB2 may be mutually offset and parallel to the insert axis AI.

Figures 8A, 8B:
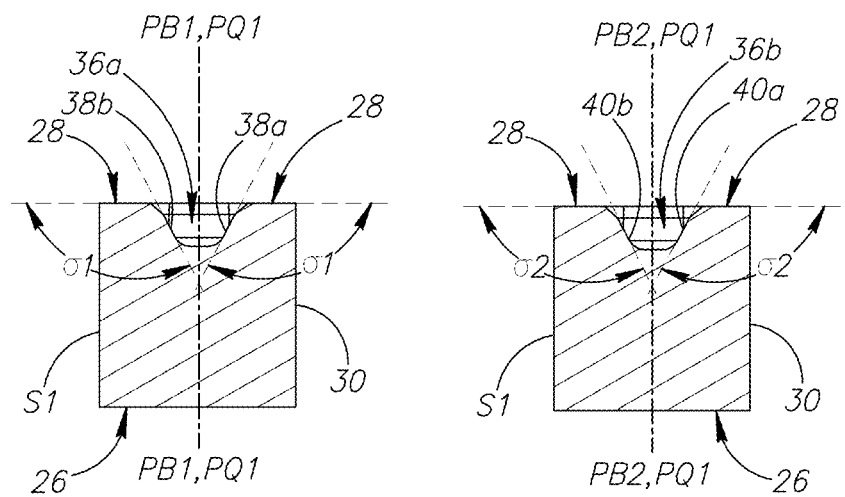
FIG. 8A is a cross-sectional view of the cutting insert shown in FIG. 4, taken along the line VIIIA-VIIIA.
FIG. 8B is a cross-sectional view of the cutting insert shown in FIG. 4, taken along the line VIIIB-VIIIB.

As shown in FIG. 8A, in a cross-section taken in a first vertical plane PV1 perpendicular to the first abutment bisector plane PB1 and intersecting the first abutment element 36a, each of the left and right first abutment surfaces 38a, 38b may form an obtuse first inclination angle σ1 with the lower surface 28.

In some embodiments of the present invention, the left and right first abutment surfaces 38a, 38b may each be planar.

As shown in FIG. 8B, in a cross-section taken in a second vertical plane PV2 perpendicular to the second abutment bisector plane PB2 and intersecting the second abutment element 36b, each of the left and right second abutment surfaces 40a, 40b may form an obtuse second inclination angle σ2 with the lower surface 28.

In some embodiments of the present invention, the left and right second abutment surfaces 40a, 40b may each be planar.

For embodiments of the present invention, in which the first and second abutment elements 36a, 36b are female-type elements, the first and second inclination angles σ1, σ2 may be internal angles.

It should be appreciated that use of the term "internal angle" throughout the description and claims refers to an angle associated with two surface components as measured internal to the member(s) on which these surface components are formed.

As shown in FIG. 4, in a bottom view of the cutting insert 20, each of the first and second abutment elements 36a, 36b may be polygonal shaped.

It should be appreciated throughout the description and claims, that a bottom view is taken along the insert axis AI.

In some embodiments of the present invention, in a bottom view of the cutting insert 20, each of the first and second abutment elements 36a, 36b may be triangular shaped.

In other embodiments of the present invention (not shown), in which the first and second abutment elements 36a, 36b are male-type elements, in a bottom view of the cutting insert 20, each of the first and second abutment elements 36a, 36b may be rhombus shaped.

Also, in other embodiments of the present invention (not shown), in which the first and second abutment elements 36a, 36b are male-type elements, the left and right first abutment surfaces 38a, 38b may converge away from the insert axis AI and the left and right second abutment surfaces 40a, 40b may converge away from the insert axis AI.

As shown in FIGS. 1 to 4, the first and second cutting portions 24a, 24b extend away from the central mounting portion 22 and have distal first and second major cutting edges 42a, 42b, respectively.

As shown in FIGS. 5 and 6, each cutting portion 24a, 24b has a rake surface 44a, 44b adjacent to its respective major cutting edge 42a, 42b facing in the upward direction DU.

In some embodiments of the present invention, the first and second cutting portions 24a, 24b may be elongated members integrally formed with the central mounting portion 22 to have one-piece unitary construction therewith.

Also, in some embodiments of the present invention, the first and second cutting portions 24a, 24b may exhibit rotational symmetry about the insert axis AI.

As shown in FIG. 3, in a top view of the cutting insert 20, the first and second cutting portions 24a, 24b extend away from the central mounting portion 22 in opposite first and second directions D1, D2, respectively.

It should be appreciated throughout the description and claims, that a top view is taken along the insert axis AI.

Also, as shown in FIG. 3, in a top view of the cutting insert 20, first and second cutting bisector lines BL1, BL2 parallel to the first and second directions D1, D2 bisect the first and second major cutting edges 42a, 42b, respectively.

According to the present invention, the first and second cutting bisector lines BL1, BL2 are mutually offset.

In some embodiments of the present invention, as shown in FIG. 3, in a top view of the cutting insert 20, the first and second major cutting edges 42a, 42b may be entirely located outside a first imaginary circle C1 containing the central mounting portion 22.

Also, in some embodiments of the present invention, the first imaginary circle C1 may be coaxial to the insert axis AI.

As shown in FIG. 3, in a top view of the cutting insert 20, the first and second major cutting edges 42a, 42b have first and second cutting widths W1, W2 measured perpendicular to the first and second cutting bisector lines BL1, BL2, respectively.

Also, as shown in FIG. 4, in a bottom view of the cutting insert 20, the first and second cutting portions 24a, 24b extend first and second cutting lengths LC1, LC2 in the first and second directions D1, D2, respectively.

In some embodiments of the present invention, the first and second cutting lengths LC1, LC2 may be greater than the first and second cutting widths W1, W2, respectively, i.e. LC1>W1 and LC2>W2.

Also, in some embodiments of the present invention, the first and second cutting lengths LC1, LC2 may be greater than two times the first and second cutting widths W1, W2, respectively, i.e. LC1>2*W1 and LC2>2*W2.

It should be appreciated that the first and second cutting portions 24a, 24b are configured to provide clearance for the first and second major cutting edges 42a, 42b along their entire longitudinal extents during a cutting operation, i.e. along the entire first and second cutting lengths LC1, LC2, respectively.

The cutting insert 20 according to the present invention, is particularly suitable for face grooving and internal grooving operations, by virtue of the first and second cutting bisector lines BL1, BL2 being mutually offset, and the first and second cutting lengths LC1, LC2 being greater than the first and second cutting widths W1, W2, respectively.

The cutting insert 20 according to the present invention, is also suitable for side grooving, turning and threading operations.

In some embodiments of the present invention, the insert thickness TI may be greater than each of the first and second cutting lengths LC1, LC2, i.e. TI>LC1 and TI>LC2.

Also, in some embodiments of the present invention, the first and second cutting portions 24a, 24b may each have a minimum cutting height $H_{MIN}$ measured parallel to the insert axis AI.

Further, in some embodiments of the present invention, the minimum cutting height $H_{MIN}$ may be greater than two thirds the insert thickness TI, i.e. $H_{MIN}>2/3*TI$.

For embodiments of the present invention, in which the insert thickness TI is greater than each of the first and second cutting lengths LC1, LC2, and the minimum cutting height $H_{MIN}$ is greater than two thirds the insert thickness TI, the first and second cutting portions 24a, 24b may be sufficiently robust so that an underside 45a, 45b of each cutting portion 24a, 24b, opposite the respective rake surface 44a, 44b, does not require support during cutting operations.

According to the present invention, the first and second cutting portions 24a, 24b are entirely located in diagonally opposite imaginary quadrants Q1, Q3 of four imaginary quadrants Q1, Q2, Q3, Q4 defined by mutually perpendicular first and second quadrant planes PQ1, PQ2 containing the insert axis AI.

In addition to containing the insert axis AI, the first quadrant plane PQ1 may extend along a long dimension of the central mounting portion 22, bisect the central mounting portion 22 and thus be considered a longitudinal insert plane PQ1. Meanwhile, in addition to the containing the insert axis AI and being perpendicular to the first quadrant plane PQ1, the second quadrant plane PQ2 may extend along a short dimension of the central mounting portion 22, bisect the central mounting portion 22, and thus be considered a transverse insert plane PQ2.

In some embodiments of the present invention, the first quadrant plane PQ1 may be coincident with the first and second abutment bisector planes PB1, PB2.

In other embodiments of the present invention (not shown), the first quadrant plane PQ1 may be parallel to (and offset from) the first and second abutment bisector planes PB1, PB2.

As shown in FIGS. 3 and 4, the first and second directions D1, D2 may each form a zero angle with the second quadrant plane PQ2.

In other embodiments of the present invention (not shown), the first and second directions D1, D2 may each form an acute angle of less than 30 degrees with the second quadrant plane PQ2.

In some embodiments of the present invention, the cutting insert 20 may have exactly two cutting portions 24a, 24b.

Also, in some embodiments of the present invention, the cutting insert 20 may exhibit rotational symmetry about the insert axis AI, and thus be indexable about the insert axis AI.

Further, in some embodiments of the present invention, in a top or bottom view of the cutting insert 20 (FIG. 3 or FIG. 4), the insert may exhibit mirror anti-symmetry about each of the first and second quadrant planes PQ1, PQ2.

It should be appreciated that the cutting insert 20 may include visual markings to assist an operator when indexing the cutting insert 20. The visual markings are not considered to detract from the insert's rotational symmetry about the insert axis AI, or the insert's mirror anti-symmetry about each of the first and second quadrant planes PQ1, PQ2.

As shown in FIG. 3, the peripheral side surface 30 may include first and second pairs of opposing side surfaces S1, S2.

In some embodiments of the present invention, the first quadrant plane PQ1 may intersect the first pair of side surfaces S1, and the second quadrant plane PQ2 may intersect the second pair of side surfaces S2.

Also, in some embodiments of the present invention, each major cutting edge 42a, 42b may be entirely located further from the first quadrant plane PQ1 than the second pair of side surfaces S2.

Further, in some embodiments of the present invention, each major cutting edge 42a, 42b may be entirely located further from the first quadrant plane PQ1 than any part of the central mounting portion 22.

As shown in FIG. 3, in a top view of the cutting insert 20, the first pair of side surfaces S1 may be parallel and offset by a first distance DS1, and the second pair of side surfaces S2 may be parallel and offset by a second distance DS2.

In some embodiments of the present invention, the first distance DS1 may be greater than the second distance DS2.

Also, in some embodiments of the present invention, in a top view of the cutting insert 20, the first and second pairs of side surfaces S1, S2 may define an imaginary rectangle RT.

The first pair of side surfaces S1 may extend along a transversely directed width dimension of the imaginary rectangle RT while the second pair of side surfaces S2 may extend along a longitudinally directed length dimension of the imaginary rectangle RT, the length dimension being longer than the width dimension. Thus, as seen in the top view of the cutting insert 20 (FIG. 3), the central mounting portion 22 has a rectangular shape which falls within, and nearly fully occupies, the rectangular footprint formed by the imaginary rectangle RT.

As shown in FIG. 7, in a cross-section taken in the first horizontal plane PH1, the left first and right second imaginary straight abutment lines L1b, L2a may form a first non-local abutment angle δ1 of less than 180 degrees, and the left second and right first imaginary straight abutment lines L2b, L1a may form a second non-local abutment angle δ2 of less than 180 degrees.

In some embodiments of the present invention, the first and second non-local abutment angles δ1, δ2 may be obtuse and equal.

For embodiments of the present invention, in which the first and second abutment elements 36a, 36b are female-type elements, the first and second non-local abutment angles δ1, δ2 may be internal angles.

As shown in FIG. 7, at least first and second points N1, N2 along the first and second major cutting edges 42a, 42b may be located in first and second regions R1, R2 subtended by the first and second non-local abutment angles δ1, δ2, respectively.

In some embodiments of the present invention, the entire first and second major cutting edges 42a, 42b may be located in the first and second regions R1, R2, respectively.

Also, in some embodiments of the present invention, the first and second points N1, N2 may be the furthest-most points of the first and second major cutting edges 42a, 42b, respectively, from the second quadrant plane PQ2.

Further, in some embodiments of the present invention, the first and second points N1, N2 may be the furthest-most points of the entire cutting insert 20 from the second quadrant plane PQ2.

It should be appreciated that for embodiments of the present invention, in which the first and second points N1, N2 are the furthest-most points of the entire cutting insert 20 from the second quadrant plane PQ2, the cutting insert 20 may be suitable for use in next-to-shoulder cutting operations.

As shown in FIGS. 9 to 14, another aspect of the present invention relates to a cutting tool 46 having an insert holder 48 and the aforementioned cutting insert 20 removably retained therein.

The insert holder 48 has a holder head 50 and a holder shank 52 longitudinally extending in a rearward direction DR therefrom along a holder axis AH.

Figure 10:
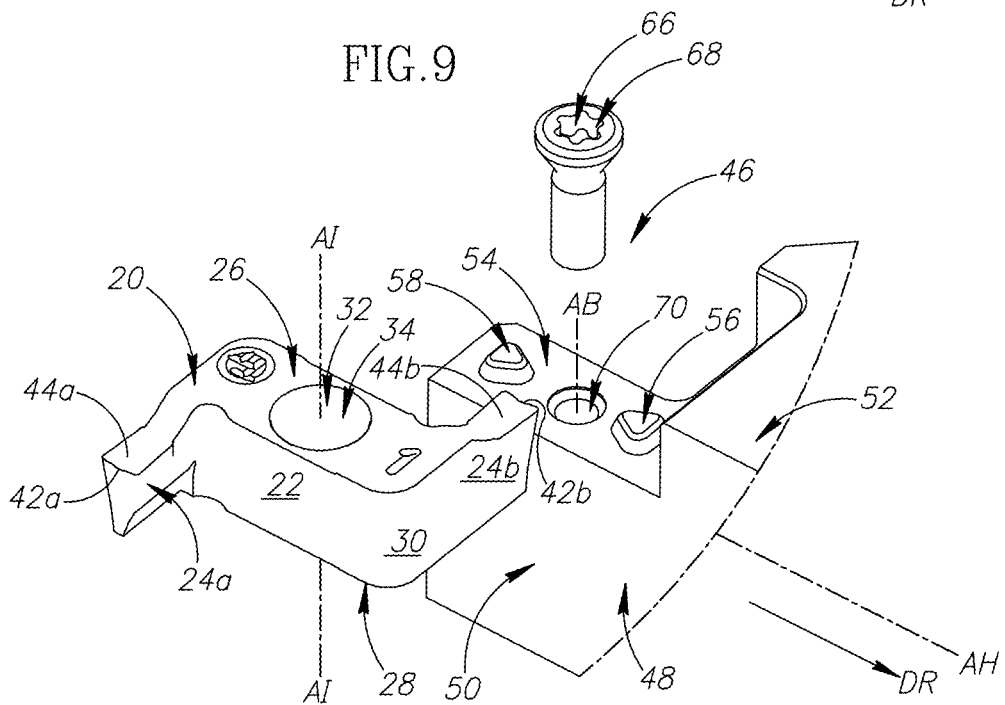
FIG. 10 is an exploded perspective view of the cutting tool shown in FIG. 9.
Figure 11:
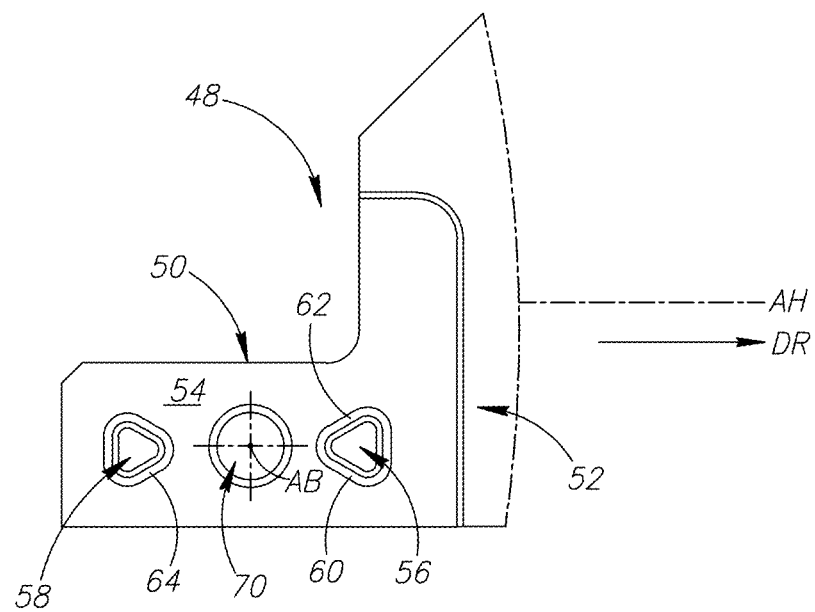
FIG. 11 is a top view of an insert holder shown in FIGS. 9 and 10.
Figure 12:
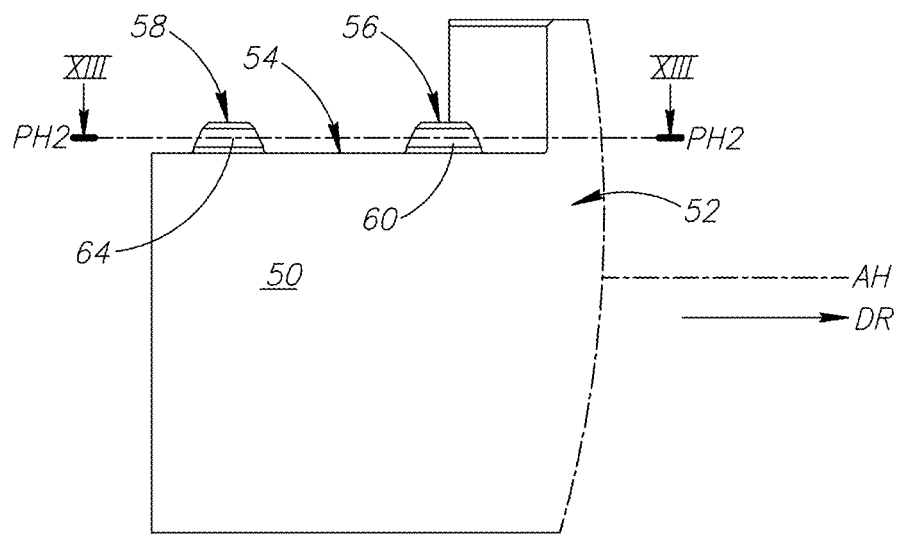
FIG. 12 is a side view of the insert holder shown in FIGS. 9 and 10.

As shown in FIGS. 10 to 12, the holder head 50 has a seat surface 54 and spaced apart first and second support elements 56, 58 associated with the seat surface 54. Each of the support elements 56, 58 may be either male or female.

It should be appreciated that use of the term "associated with the seat surface 54", throughout the description and claims, with respect to the first and second male and/or female support elements 56, 58, covers the possibility of the first and second support elements 56, 58 being male elements disposed on (i.e., protruding from) the seat surface 54, and also the possibility of the first and second support elements 56, 58 being female elements being disposed in (i.e., recessed into) the seat surface 54.

In some embodiments of the present invention, as shown in FIGS. 10 and 12, the first and second support elements 56, 58 may be male-type elements.

As shown in FIGS. 10 and 12, the first support element 56 has first and second support walls 60, 62 transverse to the seat surface 54, and the second support element 58 has a third support wall 64 transverse to the seat surface 54.

In some embodiments of the present invention, the seat surface 54 may be planar.

It should be appreciated that use of the term "planar", throughout the description and claims, with respect to the seat surface 54, covers the possibility of the seat surface 54 having a plurality of spaced apart coplanar sub-surfaces.

In each index position of the cutting insert 20:
  only one of the two cutting portions 24a, 24b is operative,
  the lower surface 28 is in contact with the seat surface 54,
  the first and second abutment elements 36a, 36b occupy or are occupied by the first and second support elements 56, 58, and
  a clamping member 66 engages the clamping aperture or recess 32 and applies a clamping force FC thereto.

For embodiments of the present invention, in which the cutting insert 20 has exactly two cutting portions 24a, 24b, the cutting insert 20 has two index positions in the cutting tool 46.

Figure 9:
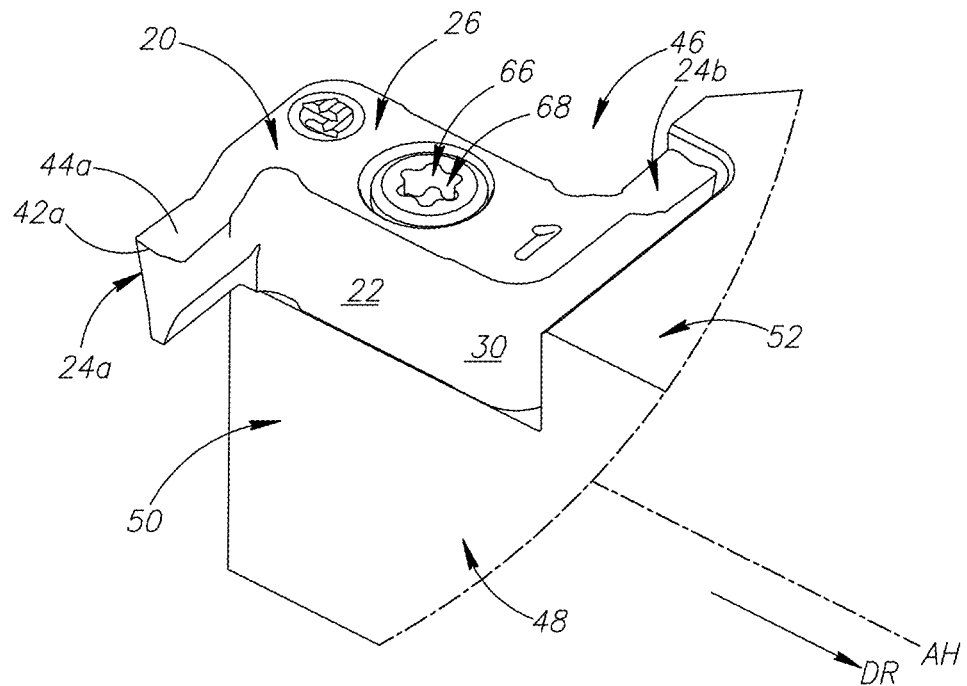
FIG. 9 is a perspective view of a cutting tool in accordance with some embodiments of the present invention.

As shown in FIGS. 9 and 10, the clamping member 66 may be in the form of a clamping screw 68, and the clamping screw 68 may pass through the clamping through bore 34 and threadingly engage a threaded bore 70 in the seat surface 54.

As shown in FIGS. 10 and 11, the threaded bore 70 has a bore axis AB.

In some embodiments of the present invention, in each index position of the cutting insert 20, the insert axis AI may be non-coaxial with the bore axis AB, and the threaded bore 70 may be eccentric in relation to the clamping through bore 34.

Also, in some embodiments of the present invention, in each index position of the cutting insert 20, the clamping force FC may be applied via the clamping screw 68 to a distinct circumferential portion of the clamping through bore 34.

For embodiments of the present invention, in which the cutting insert 20 has two index positions in the cutting tool 46, the clamping through bore 34 may have two distinct circumferential portions against which the clamping force FC is applied.

Figure 14:
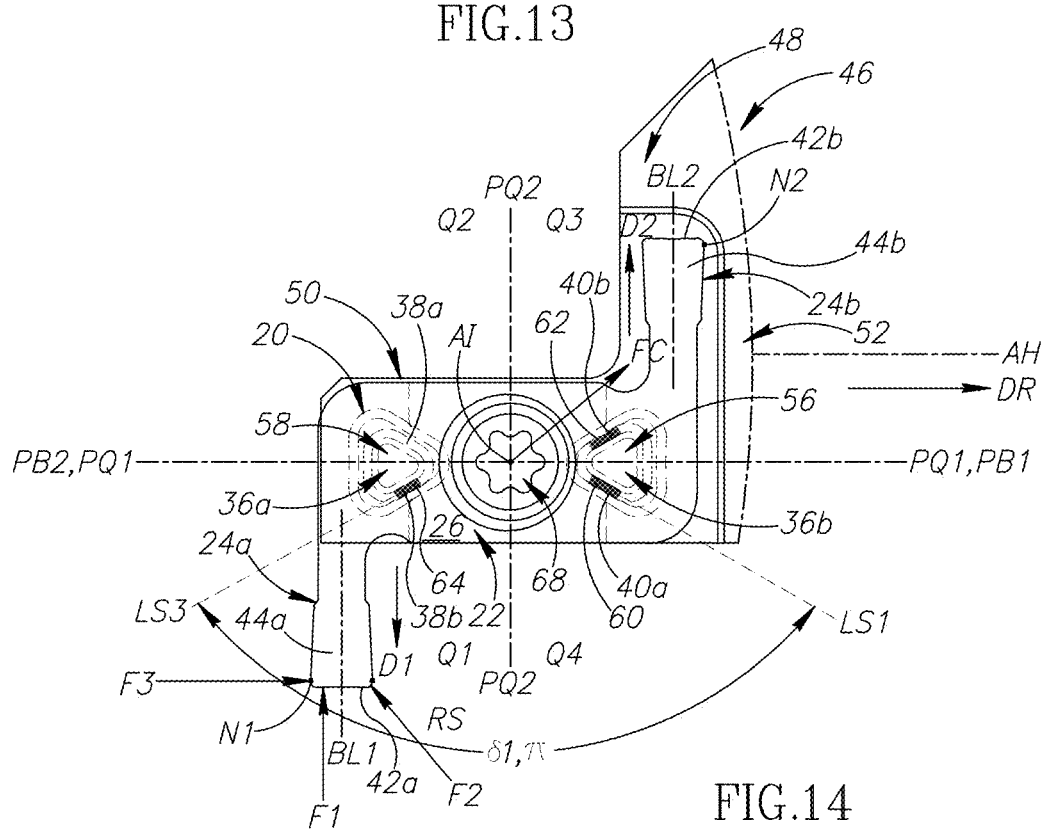
FIG. 14 is a top view of the cutting tool shown in FIG. 9, with hidden detail.

As shown in FIG. 14, in each index position of the cutting insert 20, the clamping force FC may be directed transverse to the first quadrant plane PQ1 and away from the two imaginary quadrants Q1, Q4; Q2, Q3 located on the same side of the first quadrant plane PQ1 as the operative cutting portion 24a, 24b.

Also, as shown in FIG. 14, in each index position of the cutting insert 20, the first and second support elements 56, 58 may be located on opposite sides of the second quadrant plane PQ2.

In some embodiments of the present invention, the first support element 56 may be located on the same side of the second quadrant plane PQ2 as the non-operative cutting portion 24a, 24b, and the second support element 58 may be located on the same side of the second quadrant plane PQ2 as the operative cutting portion 24a, 24b.

Also, in some embodiments of the present invention, as shown in FIGS. 10 to 14, the second support element 58 may be proximate the free end (i.e., the end remote from the holder shank 52) of the seat surface 54.

Further, in some embodiments of the present invention, the clamping force FC may be directed away from the imaginary quadrant Q1, Q3 containing the operative cutting portion 24a, 24b and towards the imaginary quadrant Q1, Q3 containing the non-operative cutting portion 24a, 24b.

Figure 13:
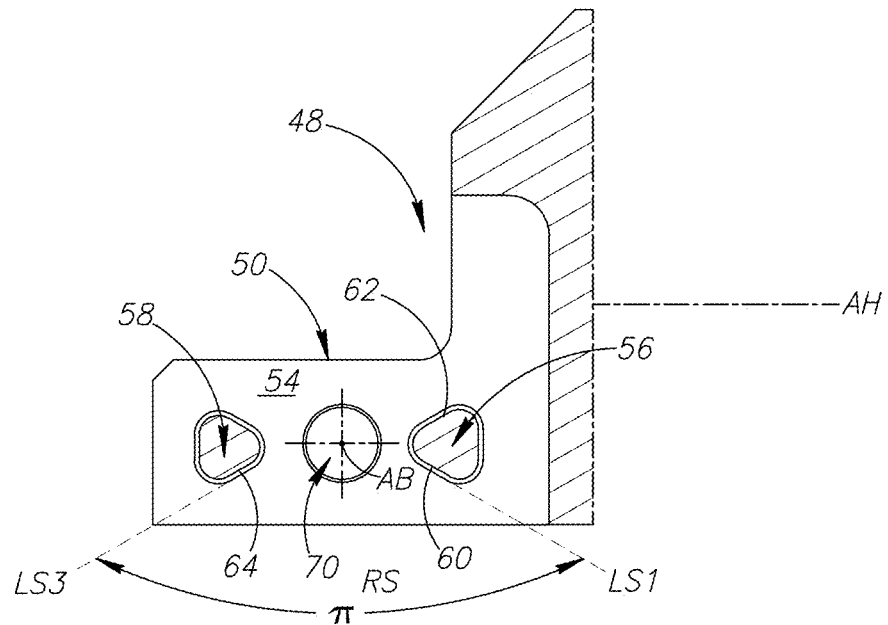
FIG. 13 is a cross-sectional view of the insert holder shown in FIG. 12, taken along the line XIII-XIII.

As shown in FIG. 13, in a cross-section taken in a second horizontal plane PH2 parallel to the seat surface 54 and intersecting the first and second support elements 56, 58, first and third imaginary straight support lines LS1, LS3 tangential to the first and third support walls 60, 64 form a support angle π of less than 180 degrees.

In some embodiments of the present invention, the support angle π may be an obtuse angle of at most 150 degrees, i.e. 90°<π≤150°.

For embodiments of the present invention, in which the first and second support elements 56, 58 are male-type elements, the support angle π may be an external angle.

The support angle π subtends a stable region RS, and when cutting forces acting on the cutting insert 20 occur at points or zones inside the stable region RS, the cutting insert 20 is removably retained in the insert holder 48 with a high level of stability.

In some embodiments of the present invention, the support angle π may be substantially equal to the first and second non-local abutment angles δ1, δ2.

Also, in some embodiments of the present invention, the first and second horizontal planes PH1, PH2 may be coincidental.

As shown in FIG. 14, in each index position of the cutting insert 20:
the left and right first abutment surfaces 38a, 38b or the left and right second abutment surfaces 40a, 40b are in contact with the first and second support walls 60, 62, respectively, and
one of the left and right first abutment surfaces 38a, 38b or one of the left and right second abutment surfaces 40a, 40b is in contact with the third support wall 64.

It should be appreciated that in each index position of the cutting insert 20, apart from the third support wall 64, no surface of the second support element 58 transverse to the seat surface 54 may be in contact with any surface of the cutting insert 20.

It should also be appreciated that for embodiments of the present invention, in which the clamping force FC is directed towards the imaginary quadrant Q1, Q3 containing the non-operative cutting portion 24a, 24b, the above-described 'three-point' contact between three of the insert's four abutment surfaces 38a, 38b; 40a, 40b and the first, second and third support walls 60, 62, 64 is ensured.

For embodiments of the present invention, in which the first and second abutment elements 36a, 36b are female-type elements and the first and second support elements 56, 58 are male-type elements, in each index position of the cutting insert 20, the right first abutment surface 38b or the right second abutment surface 40b may be in contact with the third support wall 64.

According to the present invention, in a top view of the cutting tool 46, as shown in FIG. 14, at least a point along the operative major cutting edge 42a, 42b is located in the stable region RS.

It should be appreciated that having at least a point along the operative major cutting edge 42a, 42b located in the stable region RS provides optimum stability for the cutting insert 20 against cutting forces from a range of directions, including, as shown in FIG. 14, a first cutting force F1 directed perpendicular to and towards the first quadrant plane PQ1, a second cutting force F2 directed at an angle towards the first quadrant plane PQ1 and away from the second quadrant plane PQ2, and a third cutting force F3 directed perpendicular to and towards the second quadrant plane PQ2.

In some embodiments of the present invention, the entire operative major cutting edge 42a, 42b may be located in the stable region RS.

It should be appreciated throughout the description and claims, that a top view of the cutting tool 46 is taken perpendicular to the seat surface 54.

Also, in a top view of the cutting tool 46, as shown in FIG. 14, the first and second directions D1, D2 may be perpendicular to the holder axis AH.

For embodiments of the present invention, in which the first and second directions D1, D2 are perpendicular to the holder axis AH, the cutting tool 46 may be particularly suitable for face grooving and internal grooving operations.

In other embodiments of the present invention (not shown), the first and second directions D1, D2 may be parallel to the holder axis AH.

In some embodiments of the present invention, no surface of the operative cutting portion 24a, 24b may be in contact with the holder head 50.

Also, in some embodiments of the present invention, as shown in FIG. 14, in a top view of the cutting tool 46, the operative cutting portion 24a, 24b may extend beyond the peripheral envelope of the holder head 50.

For embodiments of the present invention, in which no surface of the operative cutting portion 24a, 24b is in contact with the holder head 50, for example, when the insert's first and second cutting portions 24a, 24b are sufficiently robust, the holder head 50 may be devoid of an outwardly protruding auxiliary base member to support the operative cutting portion, and thus the insert holder 48 may be manufactured more efficiently and cost-effectively.

In each index position of the cutting insert 20, apart from the first, second and third support walls 60, 62, 64 of the first and second support elements 56, 58, no surface of the holder head 50 transverse to the seat surface 54 may be in contact with any surface of the cutting insert 20.

Also, in each index position of the cutting insert 20, no portion of the insert's peripheral side surface 30 may be in contact with the holder head 50, and thus the holder head 50 may be devoid of any peripheral support walls.

For embodiments of the present invention, in which the holder head 50 is devoid of any peripheral support walls, the holder head 50 may have a reduced compact size, making the cutting tool 46 particularly suitable for cutting operations in which there is limited access to a rotating workpiece, for example, in face grooving and internal grooving operations.

In alternative embodiments of the present invention, the holder head 150 may have a head projection 172 adjacent to the seat surface 154, which head projection 172 does not contact any surface of the cutting insert 120, but which provides a means for directing a cooling medium towards the operative major cutting edge 142a, 142b.

It should be appreciated that apart from the additional features specifically associated with alternative embodiments of the invention, having reference numerals greater than 100, the description and claims is applicable to some embodiments and to alternative embodiments of the present invention.

Figure 15:
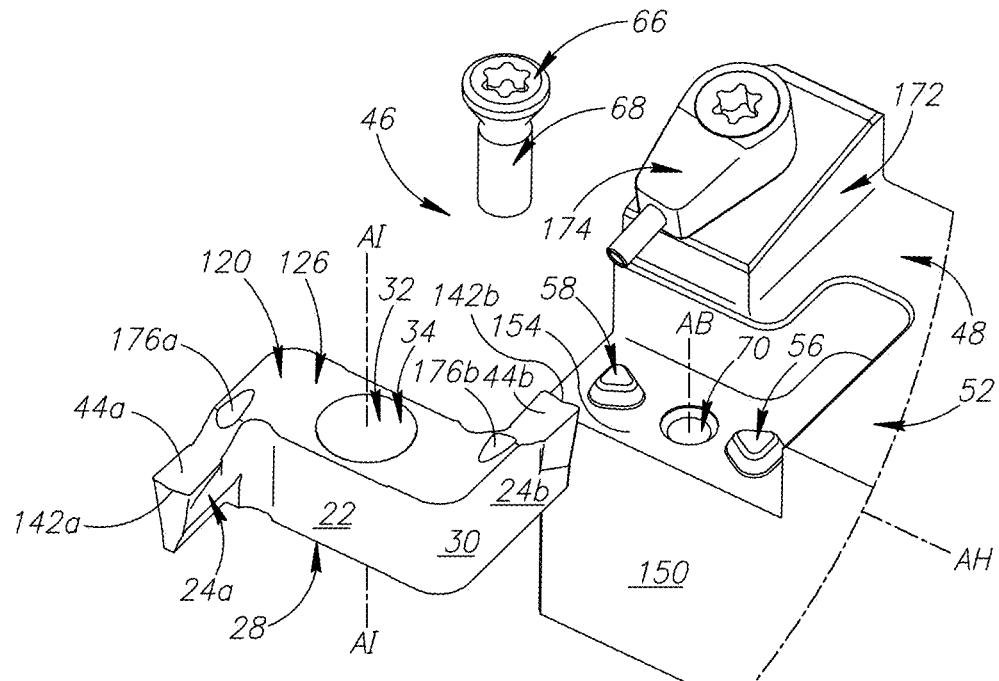
FIG. 15 is an exploded perspective view of a cutting tool in accordance with alternative embodiments of the present invention.
Figure 16:
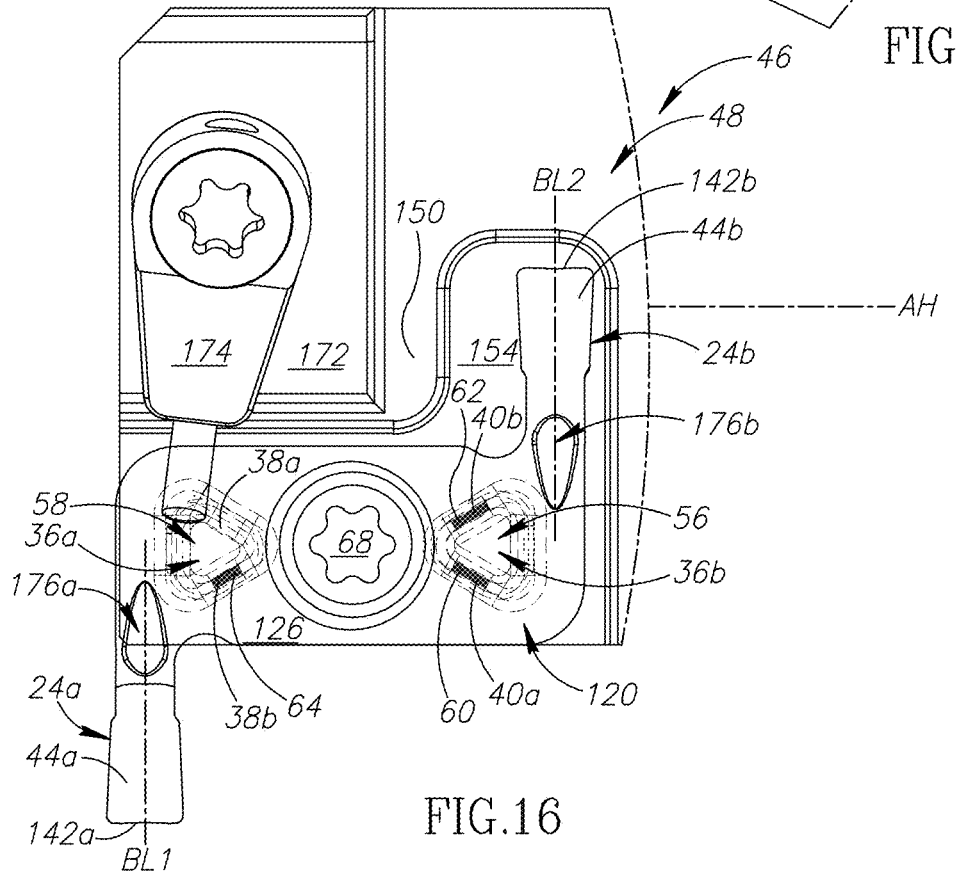
FIG. 16 is a top view of the cutting tool shown in FIG. 15, with hidden detail.

As shown in FIGS. 15 and 16, the means for directing a cooling medium towards the operative major cutting edge 142a, 142b may be in the form of a fluid delivery head 174 mounted on the head projection 172.

In other embodiments of the invention (not shown), the means for directing a cooling medium towards the operative major cutting edge 142a, 142b may be in the form of a cooling duct and cooling opening in the head projection 172.

In alternative embodiments of the present invention, the insert's upper surface 126 may have first and second cooling grooves 176a, 176b, and in a top view of the cutting insert 120, the first and second cooling grooves 176a, 176b may extend along the first and second cutting bisector lines BL1, BL2, respectively.

Also, in alternative embodiments of the present invention, the fluid delivery head 174 may be configured to direct a cooling medium to the operative major cutting edge 142a, 142b via the respective first or second cooling groove 176a, 176b.

Although the present invention has been described to a certain degree of particularity, it should be understood that various alterations and modifications could be made without departing from the spirit or scope of the invention as hereinafter claimed.

What is claimed is:

1. An indexable cutting insert (20, 120), comprising:
 a central mounting portion (22) and first and second cutting portions (24a, 24b),
  the central mounting portion (22) having opposing upper and lower surfaces (26, 126; 28), an interconnecting peripheral side surface (30), and an insert axis (AI) passing through the upper and lower surfaces (26, 126; 28) defining an upward-to-downward direction (DU, DD),
   the upper surface (26, 126) facing in the upward direction (DU),
   the lower surface (28) facing in the downward direction (DD) and having spaced apart first and second male and/or female abutment elements (36a, 36b) associated therewith,
    the first abutment element (36a) having diverging left and right first abutment surfaces (38a, 38b) transverse to the lower surface (28), which in a cross-section taken in a first horizontal plane (PH1) perpendicular to the insert axis (AI) and intersecting the first and second abutment elements (36a, 36b) has left and right first imaginary straight abutment lines (L1a, L1b) tangential to the left and right first abutment surfaces (38a, 38b) forming a first local abutment angle (α1), and a first abutment bisector plane (PB1) parallel to or containing the insert axis (AI) bisects the first local abutment angle (α1),
    the second abutment element (36b) having diverging left and right second abutment surfaces (40a, 40b) transverse to the lower surface (28), which in a cross-section taken in the first horizontal plane (PH1) has left and right second imaginary straight abutment lines (L2a, L2b) tangential to the left and right second abutment surfaces (40a, 40b) forming a second local abutment angle (α2), and a second abutment bisector plane (PB2) parallel to or containing the insert axis (AI) bisects the second local abutment angle (α2),
  the first and second cutting portions (24a, 24b) extending away from the central mounting portion (22) and having distal first and second major cutting edges (42a, 42b; 142a, 142b), respectively, and the first and second cutting portions (24a, 24b) being entirely located in diagonally opposite imaginary quadrants (Q1, Q3) of four imaginary quadrants (Q1, Q2, Q3, Q4) defined by mutually perpendicular first and second quadrant planes (PQ1, PQ2) containing the insert axis (AI),
   each cutting portion (24a, 24b) having a rake surface (44a, 44b) adjacent to its respective major cutting edge (42a, 42b; 142a, 142b) facing in the upward direction (DU),
 wherein:
 the first and second abutment bisector planes (PB1, PB2) and the first quadrant plane (PQ1) are parallel or coincident,
 and wherein in a top view of the cutting insert (20, 120):
 the first and second cutting portions (24a, 24b) extend away from the central mounting portion (22) in opposite first and second directions (D1, D2), respectively,
 first and second cutting bisector lines (BL1, BL2) parallel to the first and second directions (D1, D2) bisect the first and second major cutting edges (42a, 42b; 142a, 142b), respectively, and
 the first and second cutting bisector lines (BL1, BL2) are mutually offset.

2. The cutting insert (20, 120) according to claim 1, wherein:
 the first and second directions (D1, D2) each form a zero or acute angle of less than 30 degrees with the second quadrant plane (PQ2).

3. The cutting insert (20, 120) according to claim 1, wherein the cutting insert (20, 120) has exactly two cutting portions (24a, 24b).

4. The cutting insert (20, 120) according to claim 1, wherein the first and second abutment elements (36a, 36b) exhibit rotational symmetry about the insert axis (AI).

5. The cutting insert (20, 120) according to claim 1, wherein the upper surface (26, 126) has a force application aperture or recess (32) associated therewith.

6. The cutting insert (20, 120) according to claim 5, wherein the force application aperture or recess (32) is in the form of a clamping through bore (34) intersecting the upper and lower surfaces (26, 126; 28).

7. The cutting insert (20, 120) according to claim 1, wherein the first and second abutment bisector planes (PB1, PB2) are coincident.

8. The cutting insert (20, 120) according to claim 1, wherein the first and second local abutment angles ($\alpha 1$, $\alpha 2$) are acute angles of at least 30 degrees.

9. The cutting insert (20, 120) according to claim 1, wherein the first and second abutment elements (36*a*, 36*b*) are female-type elements.

10. The cutting insert (20, 120) according to claim 1, wherein the first and second cutting portions (24*a*, 24*b*) are elongated members integrally formed with the central mounting portion (22) to have one-piece unitary construction therewith.

11. The cutting insert (20, 120) according to claim 1, wherein in a cross-section taken in the first horizontal plane (PH1):
    the left first and right second imaginary straight abutment lines (L1*b*, L2*a*) form a first non-local abutment angle ($\delta 1$) of less than 180 degrees, and
    the left second and right first imaginary straight abutment lines (L2*b*, L1*a*) form a second non-local abutment angle ($\delta 2$) of less than 180 degrees,
    and wherein:
    at least first and second points (N1, N2) along the first and second major cutting edges (42*a*, 42*b*; 142*a*, 142*b*) are located in first and second regions (R1, R2) subtended by the first and second non-local abutment angles ($\delta 1$, $\delta 2$), respectively.

12. The cutting insert (20, 120) according to claim 11, wherein:
    the entire first and second major cutting edges (42*a*, 42*b*; 142*a*, 142*b*) are located in the first and second regions (R1, R2), respectively.

13. The cutting insert (20, 120) according to claim 1, wherein:
    the first and second major cutting edges (42*a*, 42*b*; 142*a*, 142*b*) have first and second cutting widths (W1, W2) measured perpendicular to the first and second cutting bisector lines (BL1, BL2), respectively,
    the first and second cutting portions (24*a*, 24*b*) extend first and second cutting lengths (LC1, LC2) in the first and second directions (D1, D2), respectively, and
    the first and second cutting lengths (LC1, LC2) are greater than the first and second cutting widths (W1, W2), respectively.

14. The cutting insert (20, 120) according to claim 13, wherein:
    the first and second cutting lengths (LC1, LC2) are greater than two times the first and second cutting widths (W1, W2), respectively.

15. The cutting insert (20, 120) according to claim 1, wherein in a top view of the cutting insert (20, 120):
    the first and second major cutting edges (42*a*, 42*b*; 142*a*, 142*b*) are entirely located outside a first imaginary circle (C1) containing the central mounting portion (22).

16. The cutting insert (20, 120) according to claim 1, wherein the peripheral side surface (30) includes first and second pairs of opposing side surfaces (S1, S2).

17. The cutting insert (20, 120) according to claim 16, wherein:
    the first quadrant plane (PQ1) intersects the first pair of side surfaces (S1), and
    the second quadrant plane (PQ2) intersects the second pair of side surfaces (S2).

18. The cutting insert (20, 120) according to claim 16, wherein each major cutting edge (42*a*, 42*b*; 142*a*, 142*b*) is entirely located further from the first quadrant plane (PQ1) than the second pair of side surfaces (S2).

19. A cutting tool (46) comprising:
    an insert holder (48) and an indexable cutting insert (20, 120) removably retained therein,
    the insert holder (48) having a holder head (50, 150) and a holder shank (52) longitudinally extending in a rearward direction (DR) therefrom along a holder axis (AH),
    the holder head (50, 150) having a seat surface (54, 154) and spaced apart first and second male and/or female support elements (56, 58) associated with the seat surface (54, 154),
    the first support element (56) having first and second support walls (60, 62) transverse to the seat surface (54, 154),
    the second support element (58) having a third support wall (64) transverse to the seat surface (54, 154),
    in a cross-section taken in a second horizontal plane (PH2) parallel to the seat surface (54, 154) and intersecting the first and second support elements (56, 58), first and third imaginary straight support lines (LS1, LS3) tangential to the first and third support walls (60, 64) form a support angle ($\pi$) of less than 180 degrees,
    the cutting insert (20, 120) having a central mounting portion (22) and first and second cutting portions (24*a*, 24*b*),
    the central mounting portion (22) having opposing upper and lower surfaces (26, 126; 28), an interconnecting peripheral side surface (30), and an insert axis (AI) passing through the upper and lower surfaces (26, 126; 28) defining an upward-to-downward direction (DU, DD),
    the upper surface (26, 126) facing in the upward direction (DU) and having a force application aperture or recess (32) associated therewith,
    the lower surface (28) facing in the downward direction (DD) and having spaced apart first and second male and/or female abutment elements (36*a*, 36*b*) associated therewith,
    the first abutment element (36*a*) having diverging left and right first abutment surfaces (38*a*, 38*b*) transverse to the lower surface (28), which in a cross-section taken in a first horizontal plane (PH1) perpendicular to the insert axis (AI) and intersecting the first and second abutment elements (36*a*, 36*b*) has left and right first imaginary straight abutment lines (L1*a*, L1*b*) tangential to the left and right first abutment surfaces (38*a*, 38*b*) forming a first local abutment angle ($\alpha 1$), and a first abutment bisector plane (PB1) parallel to or containing the insert axis (AI) bisects the first local abutment angle ($\alpha 1$),
    the second abutment element (36*b*) having diverging left and right second abutment surfaces (40*a*, 40*b*) transverse to the lower surface (28), which in a cross-section taken in the first horizontal plane (PH1) has left and right second imaginary straight abutment lines (L2*a*, L2*b*) tangential to the left and right second abutment surfaces (40a, 40b) forming a second local abutment angle (α2), and a second abutment bisector plane (PB2) parallel to or containing the insert axis (AI) bisects the second local abutment angle (α2), the first and second cutting portions (24a, 24b) extending away from the central mounting portion (22) and having distal first and second major cutting edges (42a, 42b; 142a, 142b), respectively, and the first and second cutting portions (24a, 24b) being entirely located in diagonally opposite imaginary quadrants (Q1, Q3) of four imaginary quadrants (Q1, Q2, Q3, Q4) defined by mutually perpendicular first and second quadrant planes (PQ1, PQ2) containing the insert axis (AI), each cutting portion (24a, 24b) having a rake surface (44a, 44b) adjacent to its respective major cutting edge (42a, 42b; 142a, 142b) facing in the upward direction (DU), wherein:

the first and second abutment bisector planes (PB1, PB2) and the first quadrant plane (PQ1) are parallel or coincident, wherein in each index position of the cutting insert (20, 120):

only one of the two cutting portions (24a, 24b) is operative, the lower surface (28) is in contact with the seat surface (54, 154), a clamping member (66) engages the clamping aperture or recess (32) and applies a clamping force (FC) thereto, the left and right first abutment surfaces (38a, 38b) or the left and right second abutment surfaces (40a, 40b) are in contact with the first and second support walls (60, 62), respectively, and one of the left and right first abutment surfaces (38a, 38b) or one of the left and right second abutment surfaces (40a, 40b) is in contact with the third support wall (64), and wherein in a top view of the cutting tool (46):

at least a point along the operative major cutting edge (42a, 42b; 142a, 142b) is located in a stable region (RS) subtended by the support angle (π).

20. The cutting tool (46) according to claim 19, wherein in a top view of the cutting tool (46):

the first and second cutting portions (24a, 24b) extend away from the central mounting portion (22) in opposite first and second directions (D1, D2), respectively, and the first and second directions (D1, D2) are both either parallel to the holder axis (AH) or perpendicular to the holder axis (AH).

21. The cutting tool (46) according to claim 19, wherein the force application aperture or recess (32) is in the form of a clamping through bore (34) intersecting the insert's upper and lower surfaces (26, 126; 28).

22. The cutting tool (46) according to claim 21, wherein:

the clamping member (66) is in the form of a clamping screw (68), and the clamping screw (68) passes through the clamping through bore (34) and threadingly engages a threaded bore (70) in the seat surface (54, 154).

23. The cutting tool (46) according to claim 19, wherein in each index position of the cutting insert (20, 120):

the first support element (56) may be located on the same side of the second quadrant plane (PQ2) as the non-operative cutting portion (24a, 24b), and the second support element (58) may be located on the same side of the second quadrant plane (PQ2) as the operative cutting portion (24a, 24b).

24. The cutting tool (46) according to claim 21, wherein in each index position of the cutting insert (20, 120):

the clamping force (FC) is directed transverse to the first quadrant plane (PQ1) and away from the two imaginary quadrants (Q1, Q4; Q2, Q3) located on the same side of the first quadrant plane (PQ1) as the operative cutting portion (24a, 24b).

25. The cutting tool (46) according to claim 21, wherein in each index position of the cutting insert (20, 120):

apart from the first, second and third support walls (60, 62, 64) of the first and second support elements (56, 58), no surface of the holder head (50, 150) transverse to the seat surface (54, 154) is in contact with any surface of the cutting insert (20, 120).

* * * * *